United States Patent
Gandhi et al.

(10) Patent No.: US 12,177,651 B2
(45) Date of Patent: Dec. 24, 2024

(54) TRAFFIC STEERING IN A HETEROGENEOUS NETWORK

(71) Applicant: Cisco Technology, Inc., San Jose, CA (US)

(72) Inventors: Indermeet Singh Gandhi, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/338,670

(22) Filed: Jun. 21, 2023

(65) Prior Publication Data

US 2023/0337098 A1    Oct. 19, 2023

Related U.S. Application Data

(63) Continuation of application No. 17/448,650, filed on Sep. 23, 2021, now Pat. No. 11,700,564, which is a continuation of application No. 15/792,602, filed on Oct. 24, 2017, now Pat. No. 11,166,216.

(60) Provisional application No. 62/535,362, filed on Jul. 21, 2017.

(51) Int. Cl.
| | |
|---|---|
| *H04W 48/02* | (2009.01) |
| *H04W 28/02* | (2009.01) |
| *H04W 28/086* | (2023.01) |
| *H04W 36/22* | (2009.01) |
| *H04W 48/06* | (2009.01) |
| *H04W 48/18* | (2009.01) |
| *H04W 76/11* | (2018.01) |
| *H04W 84/12* | (2009.01) |

(52) U.S. Cl.
CPC .......... *H04W 48/02* (2013.01); *H04W 28/02* (2013.01); *H04W 28/086* (2023.05); *H04W 48/06* (2013.01); *H04W 36/22* (2013.01); *H04W 48/18* (2013.01); *H04W 76/11* (2018.02); *H04W 84/12* (2013.01)

(58) Field of Classification Search
CPC ..... H04W 36/30; H04W 36/08; H04W 36/22; H04W 28/086; H04W 28/02; H04W 48/02; H04W 48/06; H04W 48/18; H04W 76/11; H04W 84/12
See application file for complete search history.

(56) References Cited

U.S. PATENT DOCUMENTS

| | | | | |
|---|---|---|---|---|
| 2015/0098331 A1* | 4/2015 | Ye | ............... | H04W 28/0205 370/235 |
| 2015/0289200 A1* | 10/2015 | Nylander | ............... | H04W 48/18 370/331 |
| 2016/0066245 A1* | 3/2016 | Vikberg | ............... | H04W 36/14 370/331 |
| 2016/0337903 A1* | 11/2016 | Cheng | ............... | H04W 28/12 |

* cited by examiner

Primary Examiner — Jasper Kwoh
(74) Attorney, Agent, or Firm — Patterson + Sheridan, LLP

(57) ABSTRACT

Techniques for traffic steering are disclosed. A first signal characteristic of a first connection between an electronic device and a first wireless communications network is determined. A second signal characteristic of a second connection between the electronic device and a second wireless communications network is also determined. Based on the first signal characteristic and the second signal characteristic, the electronic device is prevented from attempting to establish the second connection until one or more establishment criteria are met.

20 Claims, 6 Drawing Sheets

TRAFFIC STEERING IN A HETEROGENEOUS NETWORK

RELATED APPLICATION(S)

This application is a continuation of co-pending U.S. patent application Ser. No. 17/448,650 filed Sep. 23, 2021, which is a continuation of U.S. patent application Ser. No. 15/792,602 filed Oct. 24, 2017, which issued on Nov. 2, 2021 as U.S. Pat. No. 11,166,216, which claims benefit of United States, provisional patent application No. 62/535,362, filed on Jul. 21, 2017. The aforementioned related patent applications are herein incorporated by reference in their entirety.

TECHNICAL FIELD

The present disclosure relates generally to wireless networking, and in particular, steering traffic between a wireless local area network and a cellular network.

BACKGROUND

Current wireless-enabled user equipment (sometimes referred to a "UE" hereinafter) (e.g., smartphones, tablets, laptop computers, etc.) contain multi-radio hardware that enables wireless communication with both wireless local area networks (sometimes referred to a "WLAN" hereinafter) (e.g., 802.11-based standards, WiFi) and Third Generation Partnership Project (3GPP) defined cellular networks (e.g., 3G, 4G, LTE, 5G). Under a certain scheme, a UE in both a cellular network coverage area and WLAN coverage area automatically connects to the WLAN or automatically switches its connection from the cellular network to the WLAN, provided that a WLAN signal quality threshold is satisfied. This can be problematic, however, because the UE connects to the WLAN even when the cellular network would provide a stronger signal.

Previous systems have attempted to resolve this problem, but they exhibit several shortcomings. One type of this system, upon detecting that the cellular signal is stronger than the WLAN signal, denies the UE connection to the WLAN for a pre-determined amount of time (e.g., "backoff time"). But this generates other problems: (1) other devices experience airtime pollution because the UE continues to send several probe requests to the WLAN network while attempting to connect to it and (2) the network controller repeatedly denies subsequent association requests unless the timer expires or a WLAN signal strength threshold is satisfied. The numerousness of the denied association requests can lead to the UE blacklisting the WLAN (e.g., the UE labels the WLAN as unavailable), thereby preventing a WLAN connection even if the WLAN connection has improved (e.g., has become better than the cellular connection).

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1:
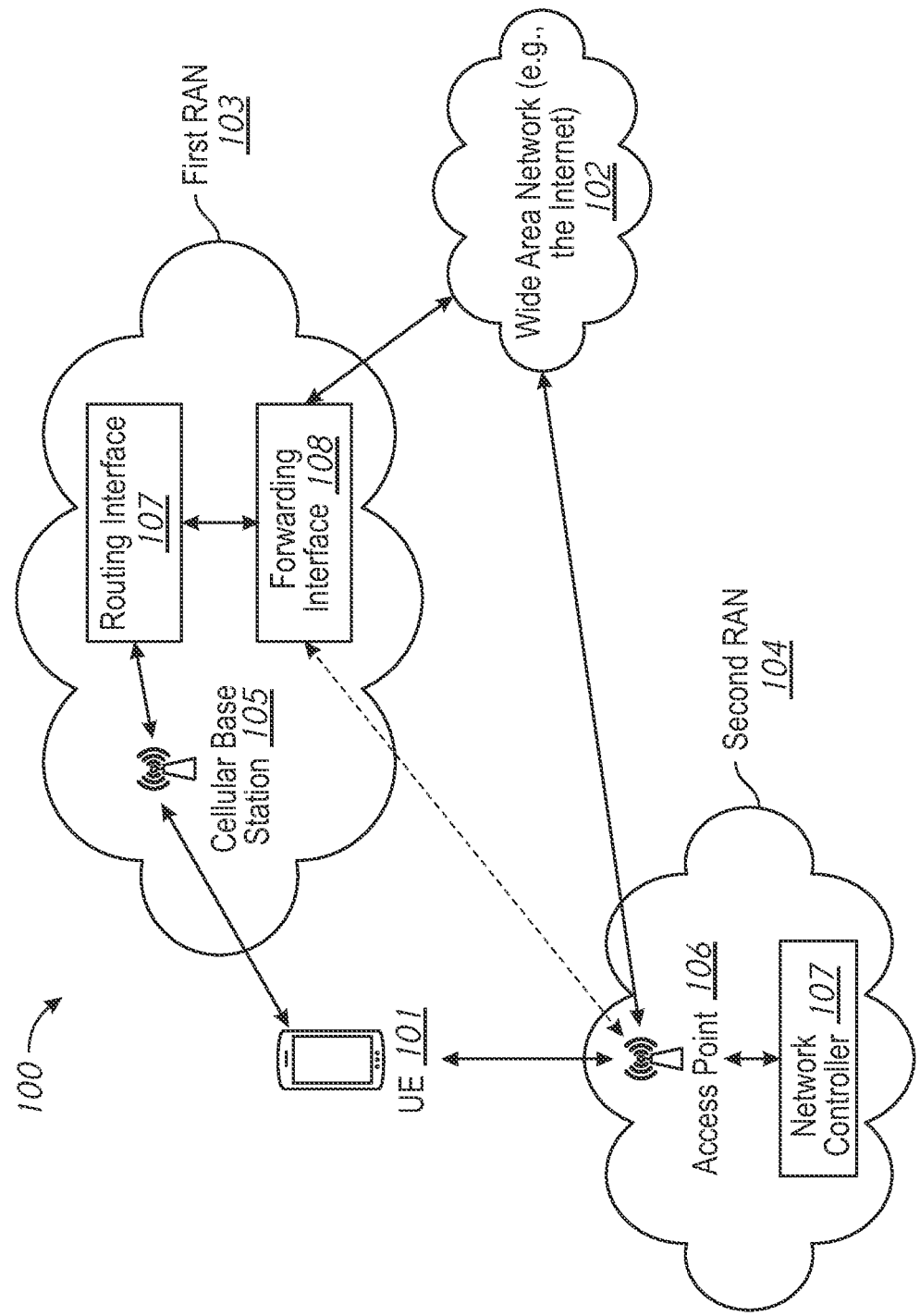
FIG. 1 is a block diagram of a system for steering UE traffic between a cellular network and a wireless LAN in accordance with various implementation described in this application.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods enabling the steering of user equipment (sometimes referred to a "UE" hereinafter) between wireless networks. Embodiments include receiving a first signal characteristic of a first connection between an electronic device and a cellular communications network, determining a second signal characteristic of a second connection between the electronic device and a wireless local area network (WLAN), determining that a first one or more establishment criteria are not met based on the first signal characteristic and the second signal characteristic, preventing the electronic device from attempting to establish the second connection based on the determining that the first one or more establishment criteria are not met, and transmitting to the electronic device a network message including a vendor specific information element (IE) identifying a second plurality of establishment criteria identifying conditions for the electronic device to attempt to establish the second connection. The second establishment criteria, identified in the vendor specific IE transmitted to the electronic device, includes both a time criteria identifying a time condition for the electronic device to attempt to establish the second connection and a connection criteria identifying a connection condition for the electronic device to attempt to establish the second connection. The electronic device parses the vendor specific IE to identify the time criteria and the connection criteria. The electronic device also determines, after the preventing based on determining that the first one or more establishment criteria are not met, that at least one of the time criteria or the connection criteria is met, and in response the electronic device attempts to re-establish the second connection.

FIG. 1 is a block diagram of a system 100 for steering UE traffic between a cellular network and a wireless LAN. The system 100 including at least two Radio Access Networks (RANs), a first RAN 103 and a second RAN 104, that each can provide a UE with connectivity to a Wide Area Network 102 (WAN) (e.g., the Internet). The system 100 includes a UE 101 (e.g., cell phone, tablet, laptop, etc.) that has multiple wireless radios, enabling it to communicate with the first RAN 103 and the second RAN 104. For ease of illustration, the system 100 of FIG. 1 depicts two RANs 103/104, but it is to be appreciated that the system 100 can include more than two RANs. Each RAN implements a Radio Access Technology (RAT). A RAT can be broadly categorized as being associated with either a cellular network (e.g., a 3GPP defined standard, such as 3G, 4G, LTE, 5G) or a Wireless Local Area Network (WLAN) (e.g., 802.11 standards, such as WiFi). The first RAN 103 is depicted is being associated with a cellular network. The second RAN 104 is depicted as being associated with a WLAN. The terms "heterogeneous wireless network (HWN)" and/or "heterogeneous network (HetNet)" can be used to describe this kind of system, in which the UE 101 is being provided connectivity to the WAN 102 through two or more RANs implementing two or more RATs.

The first RAN 103 includes one or more cellular base stations 105 that provide the UE 101 with direct connectivity to the first RAN 103 and ultimately with connectivity to the WAN 102. For example, in an LTE RAT, the base station 105 is known as an Evolved Node B (eNodeB or eNB). For example, in a 5G RAT, the base station 105 is known as a gNodeB. Traffic sent by the UE 101 and received at the base station 105 is routed and by a routing interface 107 to a forwarding interface 108, which in turn provides the traffic to the WAN 102. For example, in an LTE RAT, the routing interface 107 is known as a "Serving Gateway (SGW)," the forwarding interface 108 is known as a "Packet Data Network (PDN) Gateway (PDN-GW), and the WAN 102 is known as a "Packet Data Network."

The second RAN 104 includes one or more Access Points 106 that provide the UE 101 with direct connectivity to the second RAN 104. The Access Point 106 is IEEE 802.11 compliant (e.g. WiFi compliant). The Access Point 106 provides the UE 101 with connectivity to the WAN 102. The second RAN 104 can be integrated with the first RAN 103 in a number of ways. In some implantations, the first RAN 103 and the second RAN 104 share the forwarding interface 108, a scheme sometimes known as "seamless offloading." In some implementations, the first RAN 103 and the second RAN 104 have separate forwarding interfaces.

In some implementations, an approach for steering traffic between the first RAN 103 and the second RAN 104 is performed at a controller at the Access Point 106. In some implementations, an approach for steering traffic between the first RAN 103 and the second RAN 104 is performed at a network controller 107 within the second RAN 104, which is coupled to the Access Point 106 but resides on a network appliance separate from the Access Point 106. For example, the network controller 107 can be a Wireless LAN Controller (WLC), running Cisco's AireOS Operating System.

Figure 2:
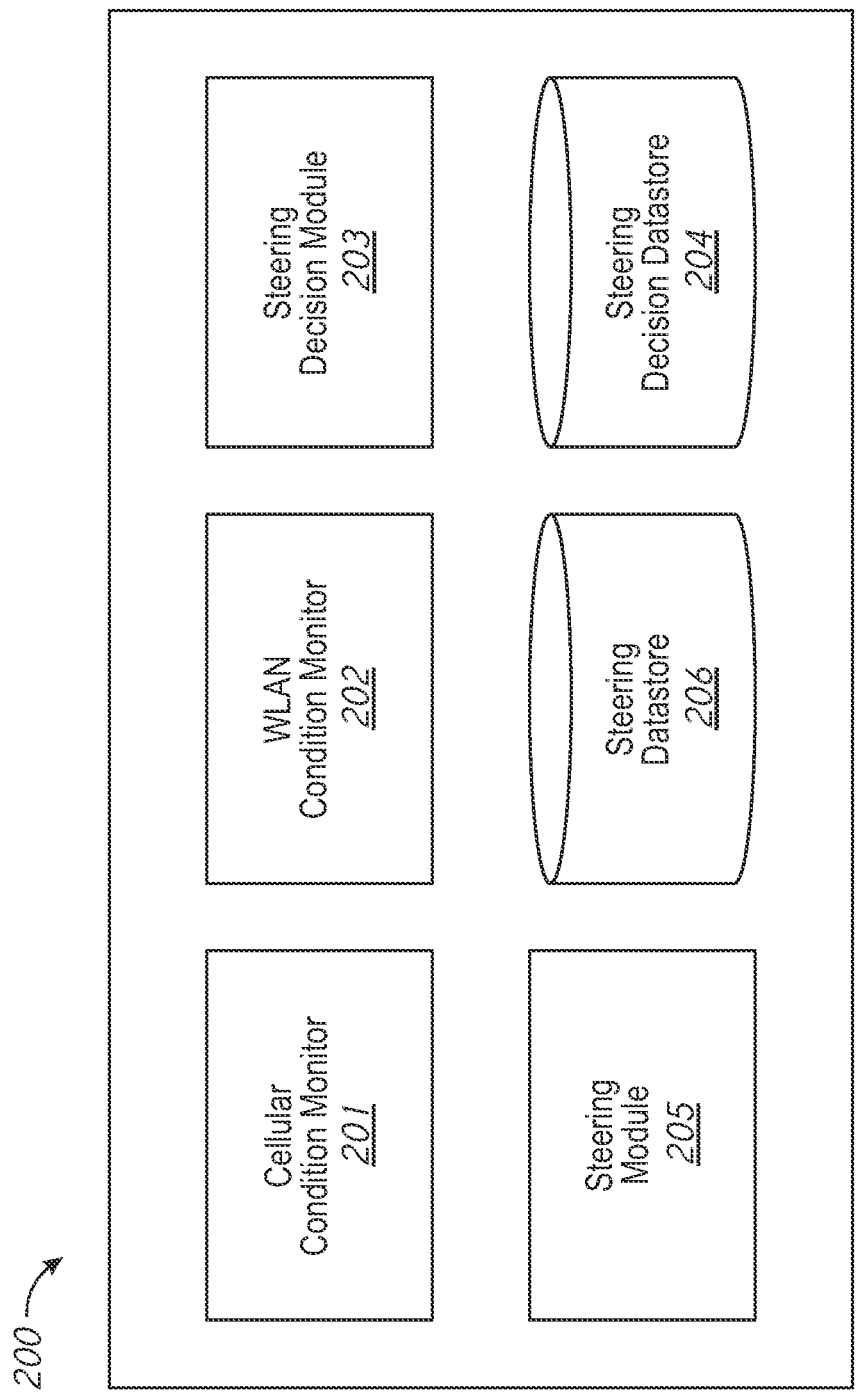
FIG. 2 is a depiction of a traffic steering controller system that functions in accordance with various implementation described in this application.

FIG. 2 is a depiction of a traffic steering controller system 200. With reference to FIG. 1, the system 200 or one or more portions of the system 200 (e.g., 201-206) can reside at the Access Point 106 and/or at the networking controller 107.

The system 200 functions according to various implementation described in this application.

The system 200 includes a cellular condition module 201. The cellular condition module 201 determines a first signal characteristic of a connection between a cellular network and a UE, the UE being in the coverage area of the cellular network and configured to communicate with the cellular network. With reference to FIG. 1, the UE can be represented as UE 101. With further reference to FIG. 1, the cellular network can be represented as a First RAN (Radio Access Network) 103 that is implementing a cellular RAT (e.g., 3G, 4G, LTE, 5G). The first signal characteristic characterizes a condition of the cellular network vis-à-vis the UE. In some implementations, the first signal characteristic can be binary (e.g., associated or not). In some implementations, the first signal characteristic can be a value. In some implementations, the first signal characteristic includes information characterizing a quality of signals between the UE and the cellular network. For example, the first signal characteristic can include a Received Signal Strength Indicator (RSSI) indicating a strength of a signal between the UE and the cellular network. In another example, the first signal characteristic includes throughput information characterizing the UE-to-cellular network link.

The system 200 includes a WLAN condition module 202. The WLAN condition module 202 determines a second signal characteristic of a connection between a WLAN and a UE, the UE being in the coverage area of the WLAN and configured to communicate with the WLAN. With reference to FIG. 1, the UE can be represented as UE 101. With further reference to FIG. 1, the WLAN can be represented as a second RAN (Radio Access Network) 104 that is implementing a WLAN RAT (e.g., 802.11, WiFi). The second signal characteristic characterizes a condition of the WLAN vis-à-vis the UE. In some implementations, the second signal characteristic can be binary (e.g., associated or not). In some implementations, the second signal characteristic can be a value. In some implementations, the second signal characteristic includes information characterizing a quality of signals between the UE and the WLAN. For example, the second signal characteristic can include a Received Signal Strength Indicator (RSSI) indicating a strength of a signal communicated between the UE and the WLAN. In another example, the second signal characteristic includes throughput information characterizing the UE-to-WLAN link.

The system 200 includes a steering decision module 203. The steering decision module 203 obtains a first signal characteristic and a second signal characteristic from the cellular condition monitor 201 and the WLAN condition monitor 202, respectively. Based on this information, the steering decision module 203 can determine whether to prevent the UE from attempting to connect to the WLAN. This determination applies to the case where the UE is currently connected to the WLAN and the case where it is not.

Whether the steering decision module 203 decides to prevent the UE from attempting to connect to the WLAN depends on the first signal characteristic and the second signal characteristic. In some implementations, a value of the first signal characteristic relative to a corresponding value of the second signal characteristic is used in determining whether to prevent the UE from attempting to connect to the WLAN. For example, the steering decision module 203 decides to prevent an attempted connection if the difference between an RSSI value associated with the UE-to-cellular connection and a corresponding RSSI value associated with the UE-to-WLAN satisfies a threshold value. In some implementations, an absolute value of the first signal characteristic and/or an absolute value of the second signal characteristic is used in determining whether to prevent the UE from attempting to connect to the WLAN. For example, the steering decision module determines to prevent an attempted connection if a throughput value characterizing the UE-to-WLAN connection satisfies a threshold. In some implementations, a combination of relative and absolute values of the first and second signal characteristics are used in determining whether to prevent the UE from attempting to connect to the WLAN.

In some implementations, a time criteria can be used in conjunction with a signal characteristic of a first signal characteristic and/or a signal characteristic of the second signal characteristic. For example, the steering decision module 203 can decide to prevent the UE from attempting to connect to the WLAN if a RSSI value associated with the second signal characteristic satisfies a threshold for at least 1 ms. In another example, the steering decision module 203 can decide to prevent the UE from attempting to connect to the WLAN if the difference between a signal strength (e.g., RSSI value) associated with the first signal characteristic and a signal strength (e.g., RSSI value) associated with the second signal characteristic satisfies a threshold for at least 0.5 ms. In another example, in an LTE deployment, the steering decision module 203 can decide to prevent the UE from attempting to connect to the WLAN if the difference between a reference signal received quality (RSRQ) associated with the first signal characteristic and the RSSI associated with the second signal characteristic satisfied a threshold for a threshold amount of time.

Threshold values (e.g., signal strength, throughput) and other criteria (e.g., time criteria) used in determining whether to prevent the UE from attempting to connect to the WLAN can be stored in the steering decision datastore 204.

The system 200 includes a steering module 205 that works in conjunction with the steering decision module 203. The steering module 205 operates to (1) prevent the UE from attempting to connect to the WLAN after the steering decision module 203 determines that a prevention is inappropriate and (2) establish a connection between the UE and WLAN if threshold and/or criteria are satisfied. By preventing the UE from attempting to connect to the WLAN in conjunction with the steering decision module 203 and facilitating establishment of a connecting to the WLAN upon threshold(s) and/or criteria being satisfied, the steering module 205 can prevent (1) airtime pollution resulting from the UE sending probe requests to the WLAN while trying to connect and (2) avoid the UE blacklisting the associated Access Point due to probe requests repeatedly ignored by the associated Access Point.

In some implementations, the steering module 205 works in conjunction with an Authentication, Authorization, and Accounting (AAA) server running a Remote Authentication Dial-In User Service (RADIUS) protocol. The AAA server (not pictured in FIG. 1) is part of the WLAN and is coupled to the UE. In some implementations, the RADIUS protocol is implemented according to Vendor Specific Attributes (VSAs). The steering module 205 can provide the AAA server with information that the AAA server can use in preventing the UE from attempting to associate with the WLAN and/or establishing a connection between the UE and the WLAN. For example, the AAA server can prevent an attempted UE connection to the WLAN if a value of a throughput of the WLAN is less than a value of a throughput of the cellular network. The steering module 205 can provide the AAA server with information according to various criteria. In some implementations, the steering module 205 provides the AAA server with messages upon the UE associating with the WLAN. In some implementations, the WLAN association module 206 provides the AAA server with messages at predetermined time intervals. In some implementations, the WLAN association module 206 provides the AAA server with messages according to a certain signal threshold being satisfied (e.g., the WLAN throughput vis-à-vis the UE connection satisfies a threshold). The discussion that follows with respect to the operation of the steering module 205 can be implemented with the steering module 205 working in conjunction with the AAA server.

Preventing the UE from Attempting to Connect to the WLAN

The steering module 205 can prevent the UE from attempting to connect to the WLAN using a number of mechanisms. In some implementations, the steering module 205 can deauthenticate (e.g., sending an 802.11 deauthentication (Deauth) frame) the UE to disassociate the UE from the WLAN. In some implementations, the steering module 205 fails to send an 802.11 association response to prevent the UE from joining the WLAN.

In a variety of implementations, the steering module 205 can prevent the UE from attempting to connect to the WLAN in a manner that removes the need for the UE to determine whether criteria are met before it later attempts to establish a connection to the WLAN. In some implementations, the steering module 205 prevents the UE from attempting to connect to the WLAN by partially null-beamforming probe responses sent to the UE in response to the UE sending probe requests in an attempt to associate with the WLAN. This partial null-beamforming leads the UE to believe the WLAN is out of range, and thus the UE will not attempt to connect to the WLAN (e.g., not send additional probe requests). If the UE uses an actual MAC address, the Access Point can send selectively partially null-beamform probe requests for the de-associated UE. If the UE uses a locally-administered address, the Access Point can beam-form based on whether the probe request satisfies a criteria (e.g., a RSSI value). In some implementations, the steering module 205 prevents the UE from attempting to connect to the WLAN by obfuscating WLAN parameters. The obfuscation leads the WLAN to appear, from the perspective of the UE, to have characteristics incompatible with those of the UE. Accordingly, the UE will not attempt to connect to the WLAN (e.g., not send additional probe requests). The obfuscated WLAN parameters can include security parameters, WLAN address (e.g., random SSID string value), and others (e.g., reserved bits in IE being populated).

Establishing a Connection Between the UE and WLAN in Accordance with Satisfaction of One or More Establishment Criteria The steering module 205 can permit the UE to connect to the WLAN in accordance with a satisfaction of one or more establishment criteria. By having the UE wait until of one more establishment criteria are satisfied before connecting to the WLAN, the UE avoids blacklisting the WLAN and frees up airtime for other devices.

In some implementations, one or more establishment criteria include a time criteria. The UE can connect to the WLAN in accordance with satisfaction of a time criteria. For example, a time criteria corresponding to 5 ms indicates to the UE to wait for 5 ms before connecting to the WLAN (e.g., sending probe requests).

In some implementations, one or more establishment criteria include a WLAN network condition criteria. The WLAN network condition criteria includes one or more thresholds relating to the condition of the UE-to-WLAN connection. If a WLAN network condition criteria is satisfied, the UE can connect to the WLAN. Using a WLAN network condition criteria allows the UE to connect to the WLAN in the event the conditions improve. For example, moving a UE sufficiently close to the WLAN could trigger satisfaction of a corresponding WLAN condition criteria.

In one implementation, the WLAN network condition criteria relates to a Received Signal Strength Indicator (RSSI) threshold. The UE can connect to the WLAN if a RSSI value corresponding to the UE satisfies the RSSI threshold. For example, the UE can determine a corresponding RSSI value based on beacons and/or probe response. In one implementation, the WLAN network condition criteria relates to a throughput threshold. For example, the UE can connect to the WLAN in response to determining that an estimated throughput of the UE-to-WLAN connection satisfies the throughput threshold. A throughput can be estimated by using, for example, the method described in IEEE 802.11-14/1246r7.

In a variety of implementations, one or more establishment criteria can be based on one or more vendor-specific information elements (IE) sent to the UE. As mentioned previously, any functionality of the steering module 205 can reside at an Access Point and/or a WLC (Wireless LAN Controller). Accordingly, in some implementations, a vendor-specific IE can be provided to the UE by the steering module 205 (e.g., as part of the WLAN infrastructure) in response to a probe request sent to the WLAN from the UE.

In some implementations, the vendor-specific IE can be included as part of a management frame (e.g., 802.11v frame). In some implementations, a vendor-specific IE can be provided to the UE in an 802.11 Deauth frame. In some implementations, a vendor-specific IE can be provided to the UE in an 802.11 Association Response.

The vendor-specific IE can include a variety of thresholds and criteria as previously described (e.g., RSSI, threshold, time). These thresholds and criteria can be stored in the steering datastore 206. Although the steering datastore 206 and the steering decision datastore 204 are depicted in FIG. 2 as being separate, it is to be appreciated that they can reside on the same memory device or on separate memory devices. Upon determining that a threshold and/or criteria is satisfied, the UE can connect to the WLAN, for example, by sending an 802.11 Association request.

In some implementations, in response to the UE being de-authenticated (e.g., by receiving a Deauth frame), the UE queries a server running a query and response protocol that defines services offered by a WLAN or Access Point. One example of this kind of server is an ANQP (Access Network Query Protocol) server. The UE queries this server (e.g., UE sends an 802.11u GAS (Generic Advertisement Service) request to an ANQP server), and the server, in response, provides one or more establishment criteria to the UE. In some implementations, the one or more establishment criteria provided by the server is based on vendor-specific options included in the request. The one or more establishment criteria provided by the server can include a variety of criteria and thresholds as describe previously (e.g., RSSI, threshold, time).

In some implementations, the UE queries a cellular-based (e.g., 3GPP) server that functions to assist the UE in discovering additional WLAN networks (e.g., WiFi, WiMAX). An example of this kind of server is an ANSDF (Access Network Discovery and Selection Function) server. The UE queries an IP-based interface (e.g., S14 for ANSDF) of the server, and the server returns one or more establishment criteria. The one or more establishment criteria provided by the ANSDF server can include a variety of criteria and thresholds as describe previously (e.g., RSSI, threshold, time).

Figure 3:
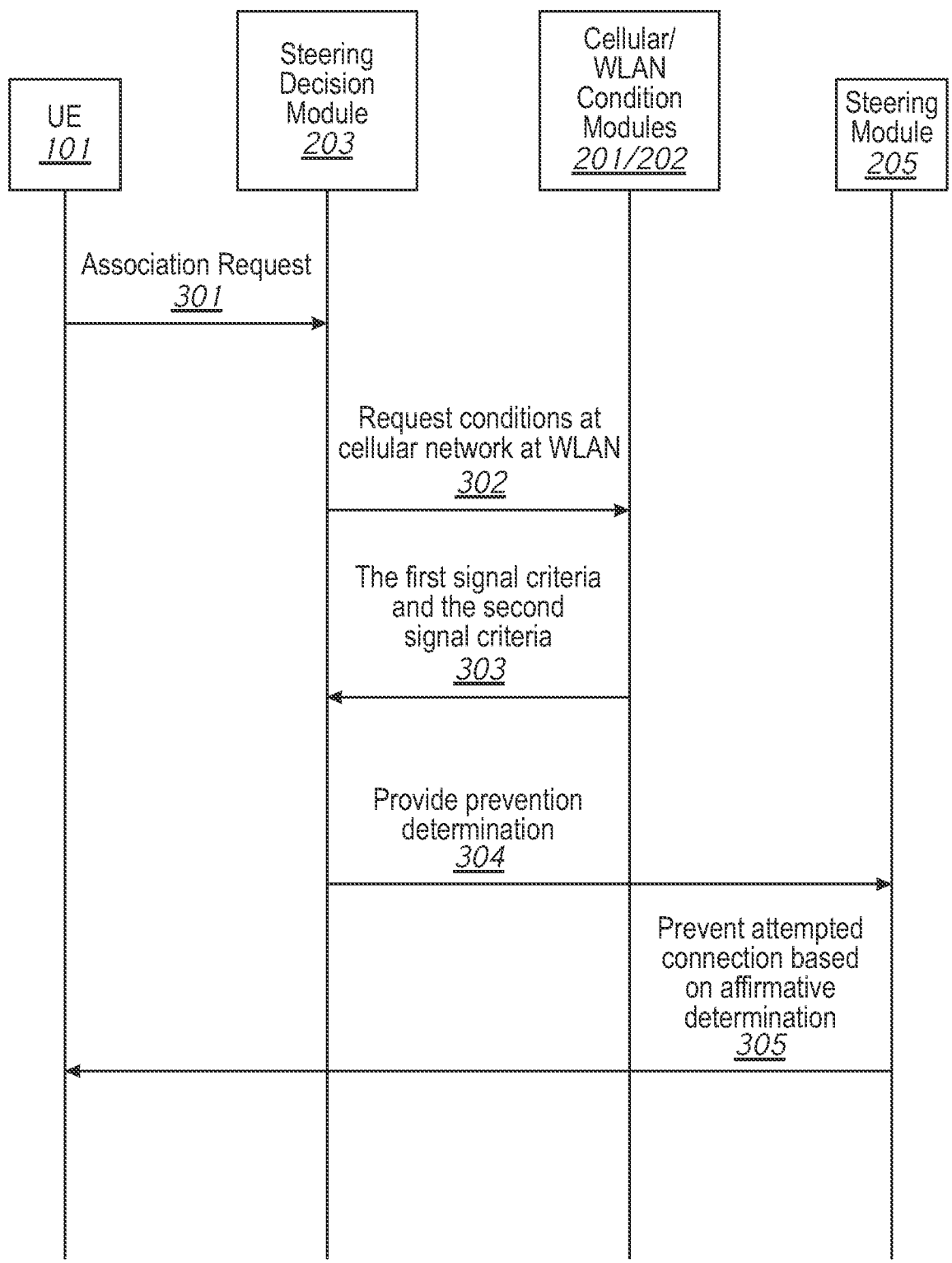
FIG. 3 is a depiction of a procedure for preventing the UE from attempting to connect to the WLAN in accordance with various implementation described in this application.

FIG. 3 is a depiction of a procedure for preventing the UE (e.g., 101) from attempting to connect to a WLAN (e.g., second RAN 104) in accordance with various implementation described in this application. At step 301, a UE 101 connected to a cellular network (e.g., first RAN 103) and within a coverage area of a WLAN sends to a steering decision module 203 a request to attempt to associate with the WLAN. This triggers the steering decision module 203, at step 302 to request from the cellular condition module 201 and from the WLAN condition module 202 current conditions at the cellular network and at the WLAN, respectively. The cellular condition module 201 and the WLAN condition module 202 at step 303 return to the steering decision module 203 a first signal characteristic and a second signal criteria that characterize conditions at the cellular network and the WLAN, respectively.

Based on the first signal characteristic and the second signal criteria, the steering decision module 203 determines whether to prevent the UE from attempting to connect to the WLAN. For example, if the first signal characteristic indicates the UE-to-cellular connection signal is stronger than a corresponding UE-to-WLAN connection signal as indicated by the second signal criteria, then the steering decision module can determine that the UE should be prevented from attempting to the WLAN. Various other first signal characteristic and second criteria and mechanisms for determining whether to prevent the UE from connecting to the WLAN based on them are described throughout this application.

At step 304, the steering decision module 203 provides to a steering module 205 the determination as to whether the UE should be prevented from attempting to connect to the WLAN. If the determination was affirmative (yes), the steering module 205 prevents the UE from attempting to connect to the WLAN. A number of mechanisms as described throughout this application can be used by the steering module 205 to prevent the UE from attempting to connect to the WLAN.

Figure 4:
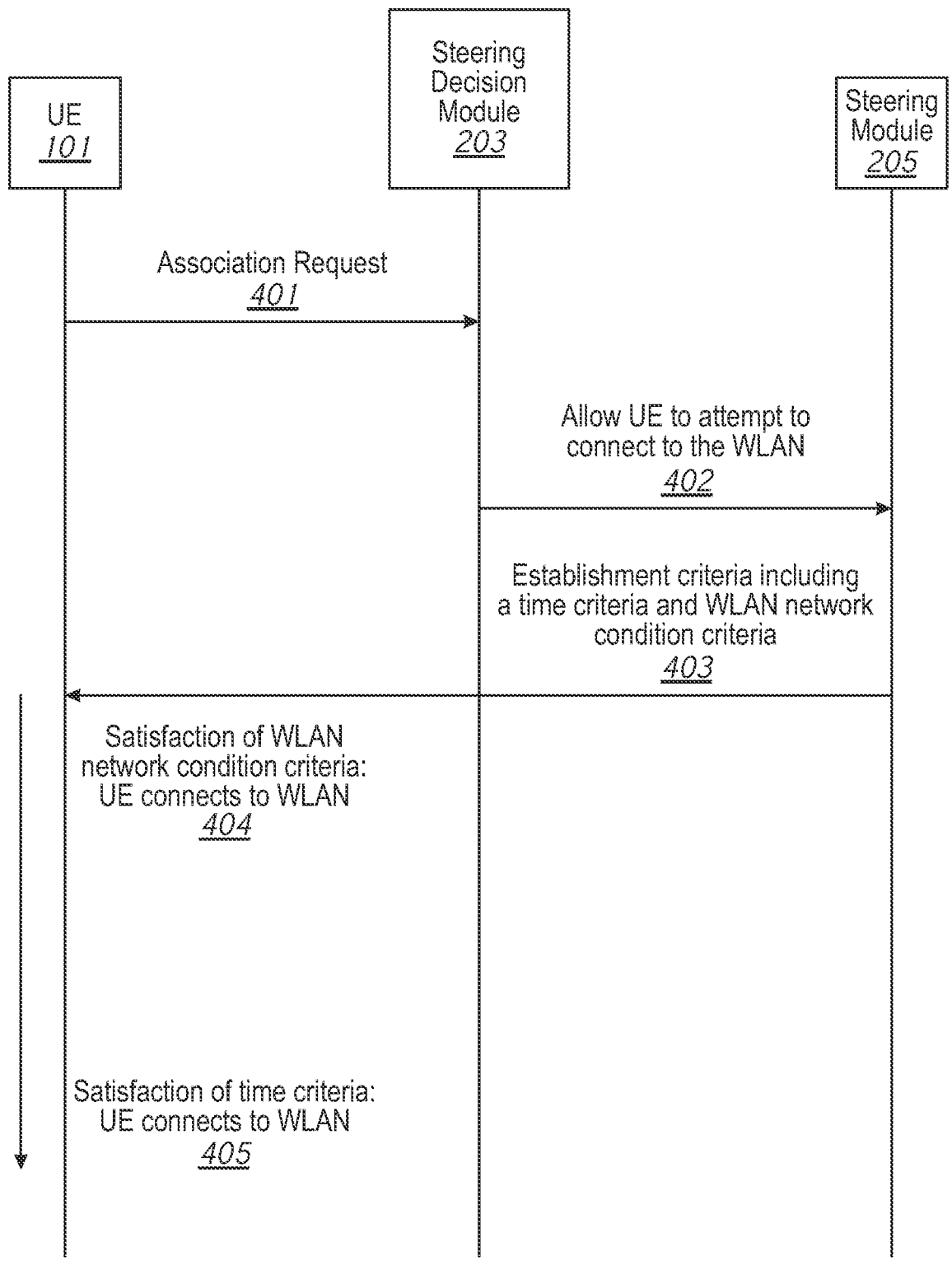
FIG. 4 is a depiction of a procedure for the UE connecting to the WLAN according to satisfaction of one or more establishment criteria in accordance with various implementation described in this application.

FIG. 4 depicts a procedure for connecting a UE (e.g., 101) to a WLAN (e.g., second RAN 104) according to satisfaction of one or more establishment criteria in accordance with various implementation described in this application. At step 401, a UE 101 connected to a cellular network (e.g., first RAN 103) and within a coverage area of a WLAN sends to a steering decision module 203 a request to attempt to associate with the WLAN. In accordance with examples provided throughout this application, the steering decision module 203 determines that the UE should be allowed to attempt to connect to the WLAN.

At step 402, the steering decision module 203 notifies the steering module 205 of this decision. In response, the steering module 205 at step 403 provides the UE with one or more establishment criteria, including a time criteria and WLAN network condition criteria. It is to be appreciated that the one or more establishment criteria need not include both the time criteria and the WLAN network condition criteria, and in some implementations include one or the other.

In some implementations, at step 404, before the time criteria is satisfied, the UE determines that the WLAN network condition criteria is satisfied and in response connects to the WLAN. For example, if a person with a cell phone walks closer to a WiFi café, the throughput of the WiFi network as estimated by the cell phone increases. If the throughput reaches an adequately high level, a WLAN network condition criteria corresponding to a throughput threshold would be satisfied, allowing the cell phone to connect to the WiFi network (e.g., begin sending probe requests to the WiFi network)

In some implementations, at step 405, the time criteria is satisfied before the UE determines that the WLAN network condition criteria is satisfied. For example, as a person with a cell phone leaves a WiFi café, an RSSI associated with the phone's connection to the WiFi network decreases. Accordingly, a WLAN network condition criteria corresponding to the RSSI threshold would not be satisfied, and the cell phone would wait a certain amount of time before satisfaction of the time criteria was satisfied before sending more probe requests. This prevents the cell phone from polluting the airtime of other UEs that have a better WiFi connection.

Figure 5:
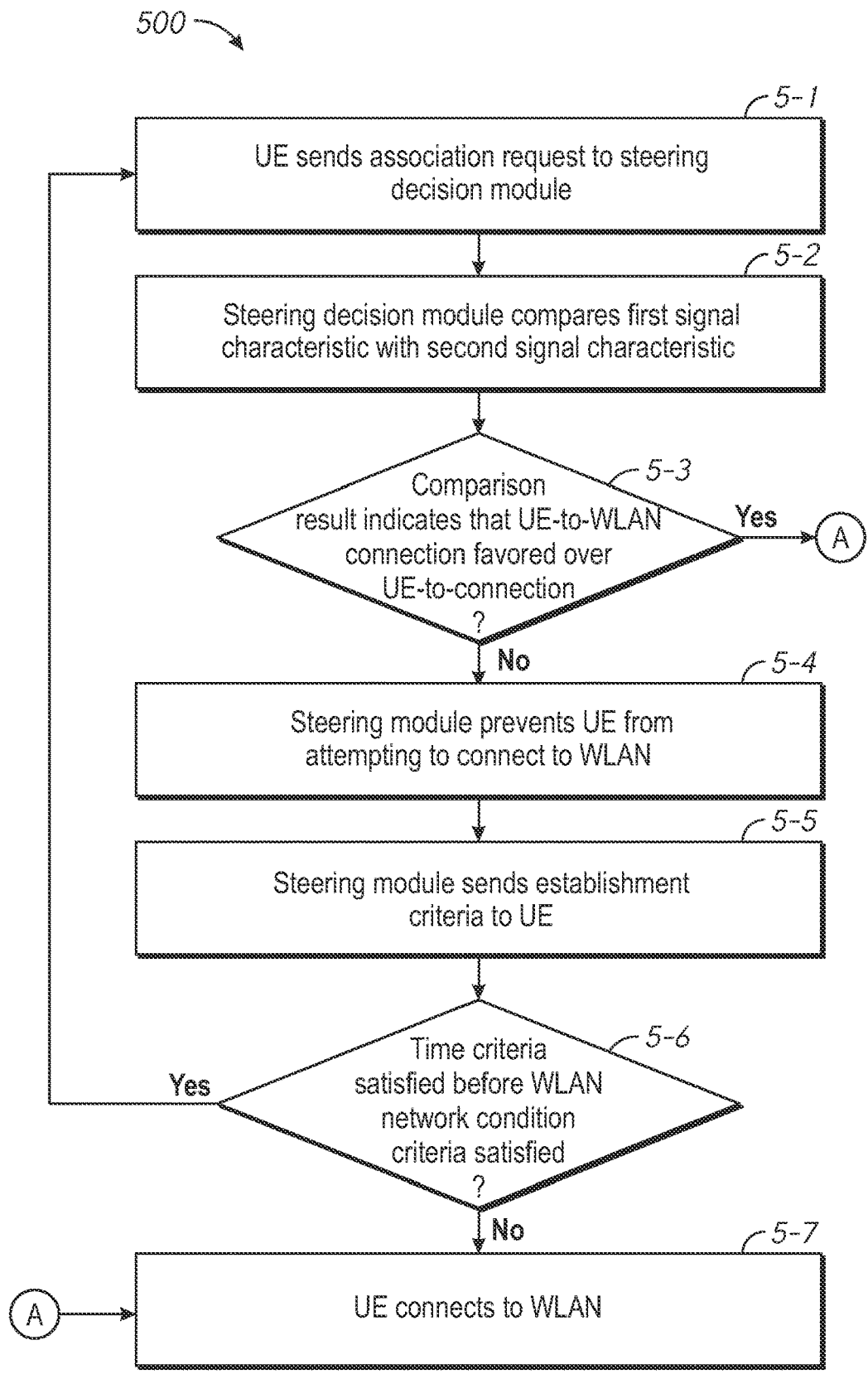
FIG. 5 is a depiction of a method of steering a UE between a cellular network and a WLAN.

FIG. 5 is a depiction of a method of steering a UE (e.g., 101) between a cellular network (e.g., First RAN 103) and a WLAN (e.g., second RAN 104) according to various implementations described in this application. At step 5-1, a UE 101 connected to a cellular network (e.g., first RAN 103) and within a coverage area of a WLAN attempts to associate with the WLAN.

In response, at step 5-2 a steering decision module 203 at the WLAN compares a first signal characteristic characterizing a condition at the cellular network with a second signal characteristic characterizing a condition at the WLAN. At step 5-3, the steering decision module 203 determines whether the result of the comparison indicates that it would be favorable for the UE 101 to attempt to connect to the WLAN. An affirmative determination ("Yes") would be reached by the steering module 203 if, for example, the first signal characteristic and the second signal characteristic collectively indicates that the cellular network is operating nearer its full-capacity than the WLAN with respect to its full-capacity. An affirmative determination leads to step 5-7, at which the UE 101 connects to the WLAN.

A negative determination ("No") leads to step 5-4, at which the steering module 205 prevents the UE from attempting to connect to the WLAN in accordance with one of the various implementations described in this application. At step 5-5, the steering module 205 sends establishment criteria to the UE 101, including a time criteria and a WLAN network condition criteria in accordance with various implementations described in this application. For example, a time criteria of 10 ms and an establishment criteria being an RSSI value of −70 db could be provided to the UE 101. At step 5-6, the steering module 205 determines whether the time criteria is satisfied before the WLAN network condition criteria is satisfied. Continuing with the example, if the UE 101 estimates a RSSI value that satisfies the −70 dbm criteria, then the steering module 205 would permit the UE 101 to connect to the WLAN (at step 5-7), by, for example, sending an 802.11 association response to the UE 101. If, however, 5 ms passes before the UE 101 estimates a RSSI value that satisfies the −70 dbm criteria, then the process moves to step 5-1 where the UE 101 can send another association request to the steering decision module 203. In this way, in the event that the UE-to-WLAN connection is not favorable to the UE 101, the UE 101 is prevented from polluting the airtime of devices connected to the WLAN for a period of time.

Figure 6:
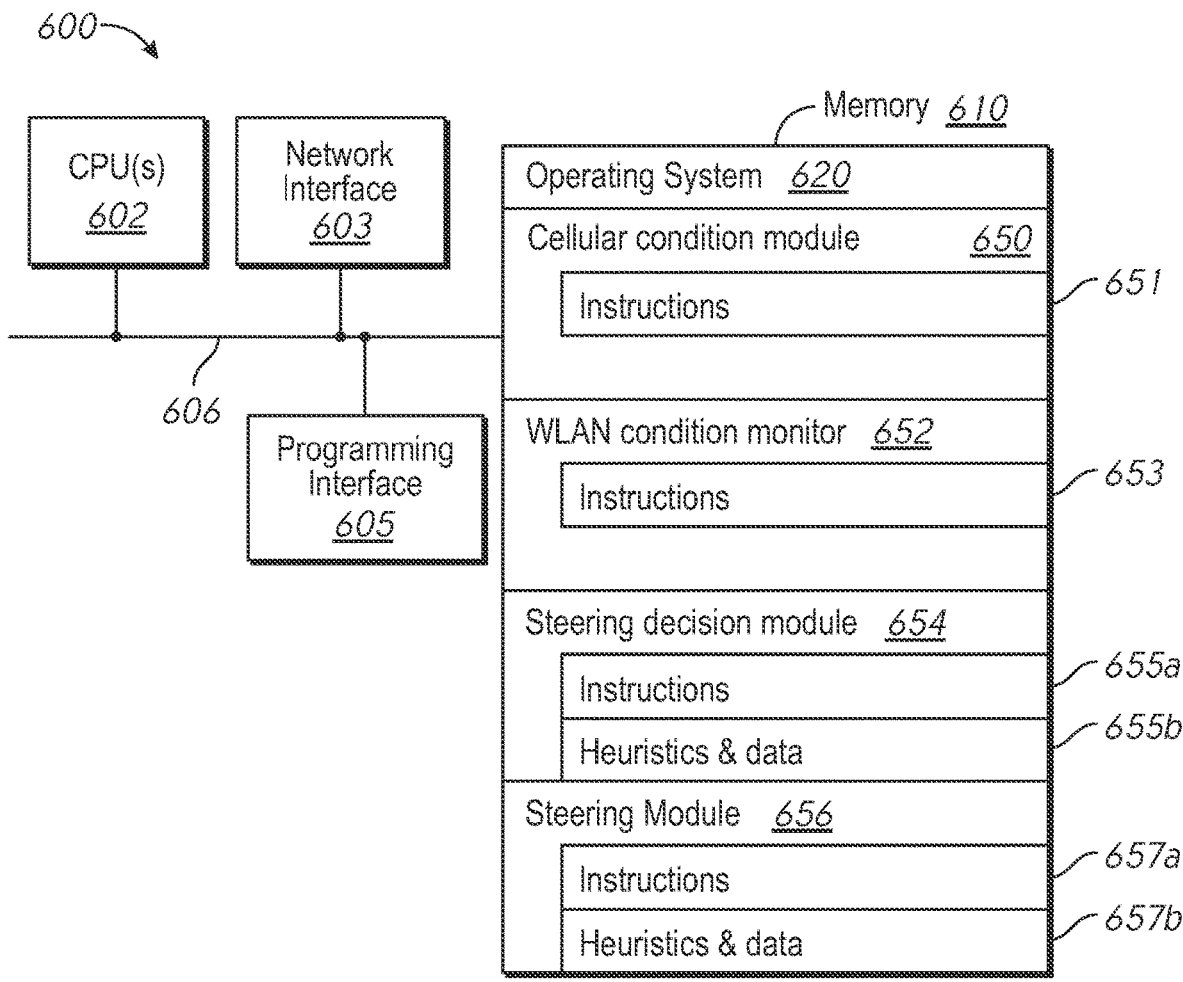
FIG. 6 is a block diagram of an example of a device in accordance with some implementations.

FIG. 6 is a block diagram of an example of a device 600 in accordance with some implementations. For example, in some implementations, the device 600 is similar to and adapted from the traffic steering controller system 200 in FIG. 2. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units (CPU's) 602, a network interface 603, a memory 610, a programming (I/O) interface 605, and one or more communication buses 604 for interconnecting these and various other components. In some implementations, the one or more communication buses 404 include circuitry that interconnects and controls communications between system components.

The memory 610 includes high-speed random access memory, such as DRAM, SRAM, DDR RAM, or other random access solid state memory devices. In some implementations, the memory 610 includes non-volatile memory, such as one or more magnetic disk storage devices, optical disk storage devices, flash memory devices, or other non-volatile solid state storage devices. The memory 610 optionally includes one or more storage devices remotely located from the one or more CPUs 402. The memory 610 comprises a non-transitory computer readable storage medium. In some implementations, the memory 610 or the non-transitory computer readable storage medium of the memory 610 stores the following programs, modules and data structures, or a subset thereof including an optional operating system 620, a cellular condition module 650, a WLAN condition module 652, a steering decision module 654, and a steering module 656.

The operating system 620 includes procedures for handling various basic system services and for performing hardware dependent tasks.

The cellular condition module 650 is configured to obtain a first signal characteristic characterizing a cellular network WLAN according to various implementations describe in this application. To that end, in various implementations, the cellular condition module 650 includes instructions and/or logic 651.

The WLAN condition module 652 is configured to obtain a second signal characteristic characterizing a WLAN according to various implementations describe in this application. To that end, in various implementations, the WLAN condition module 652 includes instructions and/or logic 653.

The steering decision module 654 is configured to obtain a first signal characteristic and a second signal characteristic from the cellular condition monitor 650 and the WLAN condition monitor 652, respectively. Based on this information, the steering decision module 654 is configured to determine whether to prevent a UE from attempting to connect to the WLAN. To that end, in various implementations, the steering decision module 654 includes instructions and/or logic 655*a*, and heuristics and data 655*bb*.

The steering module 656 is configured to, based on a determination from the steering decision module 654, prevent a UE from attempting to connect to the WLAN and/or establish a connection between the UE and the WLAN according to satisfaction of one or more establishment criteria. To that end, in various implementations, the steering module 655 includes instructions and/or logic 657*a*, and heuristics and data 657*b*.

Although the cellular condition module 650, the WLAN condition module 652, the steering decision module 654, and the steering module 656 are illustrated as residing on a single device (i.e., the device 600), it should be understood that in other implementations, any combination of the cellular condition module 650, the WLAN condition module 652, the steering decision module 654, and the steering module 656 can reside in separate computing devices. For example, each of the cellular condition module 650, the WLAN condition module 652, the steering decision module 654, and the steering module 656 can reside on a separate device.

Moreover, FIG. 6 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first signal characteristic, and, similarly, a second signal characteristic could be termed a first signal characteristic, which changing the meaning of the description, so long as all occurrences of the "first signal characteristic" are renamed consistently and all occurrences of the "second signal characteristic" are renamed consistently. The first signal characteristic and the second signal characteristic are both signal characteristics, but they are not the same signal characteristic.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    receiving a first signal characteristic of a first connection between an electronic device and a cellular communications network;
    determining a second signal characteristic of a second connection between the electronic device and a wireless local area network (WLAN);
    determining that a first one or more establishment criteria are not met based on the first signal characteristic and the second signal characteristic;
    preventing the electronic device from attempting to establish the second connection based on the determining that the first one or more establishment criteria are not met; and
    transmitting to the electronic device a network message identifying a second one or more establishment criteria identifying conditions for the electronic device to attempt to establish the second connection,
        wherein the second one or more establishment criteria comprise at least one of: (i) a time criteria identifying a time condition for the electronic device to attempt to establish the second connection or (ii) a connection criteria identifying a connection condition for the electronic device to attempt to establish the second connection,
        wherein the electronic device parses the network message to identify the second one or more establishment criteria, and
        wherein the electronic device determines, after the preventing based on determining that the first one or more establishment criteria are not met, that the at least one of the time criteria or the connection criteria is met, and in response the electronic device attempts to re-establish the second connection.

2. The method of claim 1, wherein the network message comprises one of: (i) a management frame, (ii) a deauthentication frame, or (iii) an association response.

3. The method of claim 1, wherein the second one or more establishment criteria are the same as the first one or more establishment criteria.

4. The method of claim 1, wherein the first signal characteristic and the second signal characteristic include respective information characterizing a quality of signals between the electronic device and the respective cellular communications network or WLAN.

5. The method of claim 1, wherein the first one or more establishment criteria includes a criterion that is satisfied when the first signal characteristic exceeds a first threshold value.

6. The method of claim 1, wherein the first one or more establishment criteria includes a criterion that is satisfied when the second signal characteristic exceeds a second threshold value.

7. The method of claim 1, wherein preventing the electronic device from attempting to establish the second connection includes transmitting a deauthentication frame to the electronic device.

8. The method of claim 1, wherein preventing the electronic device from attempting to establish the second connection includes partially null-beamforming probe responses transmitted to the electronic device.

9. The method of claim 1, wherein preventing the electronic device from attempting to establish the second connection includes obfuscating parameters associated with the WLAN.

10. The method of claim 1, wherein the electronic device is configured to wait to attempt to re-establish the second connection until the at least one of the time criteria or the connection criteria has been met.

11. A networking device comprising:
a computer processor; and
a memory having instructions stored thereon which, when executed on the computer processor, performs an operation comprising:
receiving a first signal characteristic of a first connection between an electronic device and a cellular communications network;
determining a second signal characteristic of a second connection between the electronic device and a wireless local area network (WLAN); and
determining that a first one or more establishment criteria are not met based on the first signal characteristic and the second signal characteristic;
preventing the electronic device from attempting to establish the second connection based on the determining that the first one or more establishment criteria are not met; and
transmitting to the electronic device a network message identifying a second one or more establishment criteria identifying conditions for the electronic device to attempt to establish the second connection,
wherein the second or one more establishment criteria comprise at least one of: (i) a time criteria identifying a time condition for the electronic device to attempt to establish the second connection or (ii) a connection criteria identifying a connection condition for the electronic device to attempt to establish the second connection,
wherein the electronic device parses the network message to identify the second one or more establishment criteria, and
wherein the electronic device determines, after the preventing based on determining that the first one or more establishment criteria are not met, that the at least one of the time criteria or the connection criteria is met, and in response the electronic device attempts to re-establish the second connection.

12. The networking device of claim 11, wherein the first one or more establishment criteria includes a criterion that is satisfied when the first signal characteristic exceeds a first threshold value and/or the second signal characteristic exceeds a second threshold value.

13. The networking device of claim 11, wherein preventing the electronic device from attempting to establish the second connection includes transmitting a deauthentication frame to the electronic device.

14. The networking device of claim 11, wherein preventing the electronic device from attempting to establish the second connection includes partially null-beamforming probe responses transmitted to the electronic device.

15. The networking device of claim 11, wherein preventing the electronic device from attempting to establish the second connection includes obfuscating parameters associated with the WLAN.

16. The networking device of claim 11, wherein the network message comprises one of: (i) a management frame, (ii) a deauthentication frame, or (iii) an association response.

17. A non-transitory memory storing one or more programs, the one or more programs comprising instructions, which, when executed by one or more processors performs an operation comprising:
receiving a first signal characteristic of a first connection between an electronic device and a cellular communications network;
determining a second signal characteristic of a second connection between the electronic device and a wireless local area network (WLAN);
determining that a first one or more establishment criteria are not met based on the first signal characteristic and the second signal characteristic;
preventing the electronic device from attempting to establish the second connection based on the determining that the first one or more establishment criteria are not met; and
transmitting to the electronic device a network message identifying a second one or more establishment criteria identifying conditions for the electronic device to attempt to establish the second connection,
wherein the second one or more establishment criteria comprise at least one of: (i) a time criteria identifying a time condition for the electronic device to attempt to establish the second connection or (ii) a connection criteria identifying a connection condition for the electronic device to attempt to establish the second connection,
wherein the electronic device parses the network message to identify the second one or more establishment criteria, and
wherein the electronic device determines, after the preventing based on determining that the first one or more establishment criteria are not met, that the at least one of the time criteria or the connection criteria is met, and in response the electronic device attempts to re-establish the second connection.

18. The non-transitory memory of claim 17, wherein the first one or more establishment criteria include a criterion that is satisfied when the first signal characteristic exceeds a first threshold value and/or the second signal characteristic exceeds a second threshold value.

19. The non-transitory memory of claim 17, wherein preventing the electronic device from attempting to establish the second connection includes at least one of:
transmitting a deauthentication frame to the electronic device;
partially null-beamforming probe responses transmitted to the electronic device; or
obfuscating parameters associated with the WLAN.

20. The non-transitory memory of claim 17, wherein the network message comprises one of: (i) a management frame, (ii) a deauthentication frame, or (iii) an association response.

* * * * *